United States Patent [19]
Kos

[11] Patent Number: 5,160,043
[45] Date of Patent: Nov. 3, 1992

[54] METHOD OF EXHAUSTING DISSOLVED OXYGEN IN A NITROGEN REMOVAL WASTEWATER TREATMENT PROCESS

[75] Inventor: Peter Kos, Ridgefield, Conn.

[73] Assignee: I. Krüger, Inc., Cary, N.C.

[21] Appl. No.: 756,501

[22] Filed: Sep. 9, 1991

[51] Int. Cl.[5] ............................................. C02F 3/30
[52] U.S. Cl. .................................... 210/605; 210/621; 210/630; 210/903
[58] Field of Search ............... 210/605, 607, 621, 630, 210/195.1, 257.1, 259, 903

[56] References Cited

U.S. PATENT DOCUMENTS

| | | | |
|---|---|---|---|
| 3,964,998 | 6/1976 | Barnard | 210/605 |
| 4,183,809 | 1/1980 | Klapwijk et al. | 210/903 |
| 4,183,810 | 1/1980 | Baenens et al. | 210/903 |
| 4,315,821 | 2/1982 | Climenhage | 210/903 |
| 4,415,454 | 11/1983 | Fuchs | 210/903 |
| 4,917,802 | 4/1990 | Fukaya et al. | 210/630 |
| 4,999,111 | 3/1991 | Williamson | 210/903 |

FOREIGN PATENT DOCUMENTS 3427310 7/1985 Fed. Rep. of Germany .
56-65693 6/1981 Japan .
57-187097 11/1982 Japan .

Primary Examiner—Stanley S. Silverman
Assistant Examiner—Christopher Upton
Attorney, Agent, or Firm—Rhodes, Coats & Bennett

[57] ABSTRACT

The present invention relates to a nitrogen removal wastewater treatment process and system that entails an anoxic treatment zone followed by an oxic treatment zone with internal recycle of mixed liquor from the oxic treatment zone to the preceding anoxic treatment zone. Prior to recycling the nitrified mixed liquor back into the anoxic zone, the mixed liquor is held within a dissolved oxygen exhauster tank for a selected period of time where the dissolved oxygen concentration of the nitrified mixed liquor is substantially reduced to preferably below 0.5 ppm.

4 Claims, 1 Drawing Sheet

: 
METHOD OF EXHAUSTING DISSOLVED OXYGEN IN A NITROGEN REMOVAL WASTEWATER TREATMENT PROCESS

FIELD OF THE INVENTION

The present invention relates to activated sludge wastewater treatment processes and more particularly to an activated sludge wastewater treatment process for removing nitrogen.

BACKGROUND OF THE INVENTION

In recent years, state and federal regulations have continued to decrease the limits of certain nutrients, particularly phosphorus and nitrogen, that can be discharged from wastewater treatment facilities into streams, lakes, etc. A great deal of emphasis has been placed on reducing the nitrogen discharge levels to below 3 ppm.

In order to efficiently remove nitrogen, many wastewater treatment facilities have been designed to remove nutrients, nitrogen and phosphorus, biologically. For example, one is referred to the disclosures of U.S. Pat. Nos. 4,056,465 and 3,964,998 that disclose two types of biological wastewater treatment processes.

All the biological nitrogen removing systems are based on a combination of nitrification and denitrification processes. During nitrification, ammonia is oxidized to nitrate and nitrites. During denitrification the nitrates and the nitrites are converted to the molecular nitrogen which is then released to the atmosphere. The denitrifying bacteria are capable of using either molecular oxygen or nitrate oxygen as a terminal electron acceptor when they oxidize organic compounds. Under anoxic conditions (such as in the absence of free molecular oxygen), denitrifying bacteria reduce nitrate by a process called nitrate dissimilation in which nitrate or nitrite replaces oxygen in cell respiration. If both oxygen as well as nitrate oxygen are present, the denitrification bacteria will first use up the dissolved oxygen for oxidation of organic compounds before using nitrate oxygen.

Nitrogen removal typically involves a system having an anoxic treatment zone followed by an oxic zone with an internal recycle of nitrified mixed liquor from the oxic treatment zone back to the preceding anoxic treatment zone. The problem comes into play because the nitrified mixed liquor recycled from the oxic zone to the preceding anoxic zone contains a significant dissolved oxygen concentration, typically in the range of 2-4 ppm. The dissolved oxygen recycled back to the anoxic zone oxidizes significant portion of the incoming soluble BOD and thus reduces the BOD available for denitrification. This has a harmful and detrimental effect on the denitrification process carried out in the anoxic zone.

Therefore, there is a need for a nitrogen removal process that efficiently utilizes all or substantially all of the incoming soluble BOD to effectuate denitrification by reducing or eliminating the detrimental effect of dissolved oxygen, recycled to the anoxic zone, on the total denitrification process.

SUMMARY AND OBJECTS OF THE INVENTION

The present invention entails an efficient nitrogen removal process and system which minimizes the effect of dissolved oxygen on the total denitrification process. In particular, the method of the present invention entails exhausting dissolved oxygen from the mixed liquor being recycled from the oxic treatment zone to the anoxic treatment zone. Effectively, the dissolved oxygen of the nitrified mixed liquor is reduced to approximately 0.5 ppm or less before being directed back into the anoxic denitrifying tank.

It is therefore an object of the present invention to provide an activated sludge wastewater treatment process for efficiently removing nitrogen.

Another object of the present invention resides in the provision of a wastewater treatment process for removing nitrogen wherein there is provided a dissolved oxygen exhauster interposed between an oxic treatment zone and an anoxic treatment zone for exhausting dissolved oxygen associated with nitrified mixed liquor being recycled from the oxic zone back to a preceding anoxic zone.

Still a further object of the present invention resides in the provision of a nitrogen removal wastewater treatment process that is provided with a dissolved oxygen exhauster interposed between an oxic treatment zone and a preceding anoxic treatment zone for substantially reducing the dissolved oxygen concentration of recycled nitrified mixed liquor.

Other objects and advantages of the present invention will become apparent and obvious from a study of the following description and the accompanying drawings which are merely illustrative of such invention.

DESCRIPTION OF THE INVENTION

Figure 1:
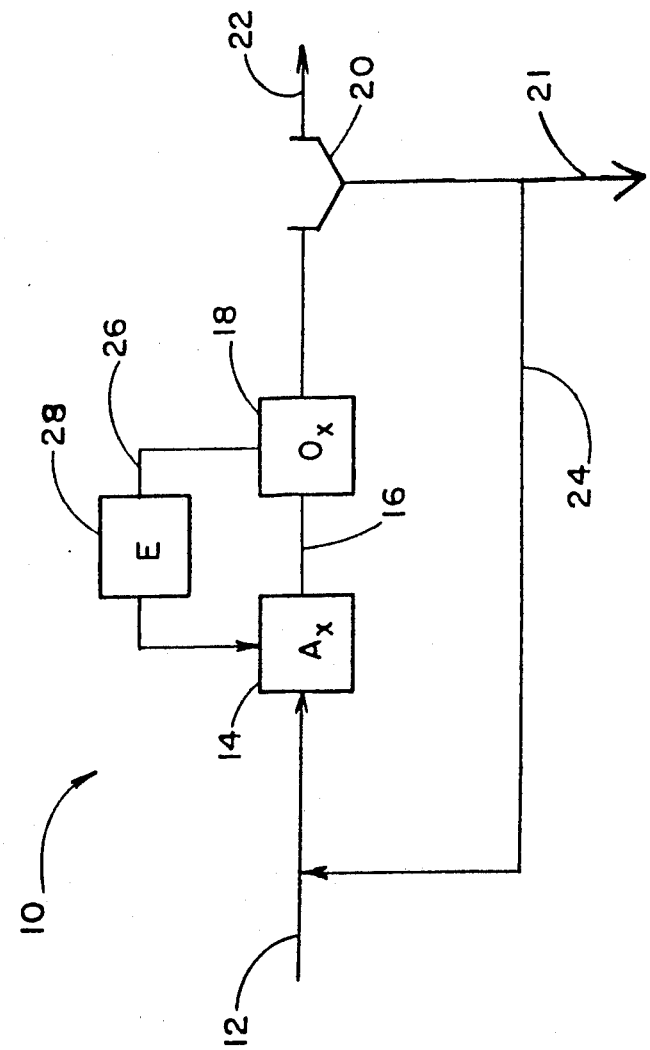
FIG. 1 is a flow schematic showing the basic nitrogen removal process of the present invention.

With further reference to FIG. 1, an activated sludge wastewater treatment process is shown therein and indicated generally by the numeral 10. As will be appreciated from subsequent portions of this disclosure, the wastewater treatment process illustrated in FIG. 1 is a basic nitrogen removal process.

Viewing the schematic, BOD containing wastewater influent enters via line 12 and is mixed with return activated sludge flowing in line 24. The mixture of wastewater influent and return activated sludge forms a mixed liquor. The formed mixed liquor is directed into a mixed anoxic treatment zone 14. There in conventional fashion a biological denitrification process occurs. Details of the denitrification process is not dealt with herein in detail because such is conventional and well-known and appreciated to those skilled in the art. Suffice it to say that in the anoxic zone 14, microorganisms acting on nitrites and nitrates, $NO_2$ and $NO_3$ (commonly referred to as $NO_x$) act to take up the oxygen associated with the $NO_x$ and in the process convert the $NO_x$ to elemental nitrogen which escapes to the atmosphere.

Denitrified mixed liquor passes from anoxic zone 14 via line 16 to an oxic or aerobic treatment zone 18. Here the mixed liquor is typically mixed and subjected to aeration. Typically, there is significant dissolved oxygen associated with the mixed liquor in the oxic zone 18. Typically, the dissolved oxygen in the oxic zone 18 will be in the range of 2 to 4 mg/l. Oxic zone 18 performs a conventional nitrification process which converts ammonia and organic nitrogen to $NO_x$.

A portion of the nitrified mixed liquor of oxic zone 18 is recycled through line 26 back to the preceding anoxic zone 14. The remainder of the nitrified mixed liquor leaving the oxic zone 18 is directed into a final clarifier 20. Clarifier 20 separates the mixed liquor into purified or treated wastewater which is directed out discharge line 22 and sludge which is returned in line 24 to be mixed with the incoming wastewater influent passing in line 12 to form the mixed liquor. A portion of the sludge is wasted through line 21.

Referring back to the internal recycle from oxic zone 18 to the anoxic zone 14 it is seen that the nitrified mixed liquor leaving oxic zone 18 is directed into an exhauster holding tank 28 prior to being recycled back into the anoxic zone 14. Exhauster holding tank 28 serves the principal function of exhausting or substantially reducing the dissolved oxygen in the mixed liquor leaving the oxic zone 18. As noted before, in order to provide an efficient nitrogen removal process, it is important to efficiently utilize the available BOD passing into the process with the wastewater influent. In particular, it is important that there be a sufficient supply of soluble BOD directed into the anoxic zone 14 to form a complete or efficient denitrification function. Consequently, it is desirable that the nitrified mixed liquor that is returned to the anoxic zone 14 have a very low dissolved oxygen concentration. This is because dissolved oxygen recycled to the anoxic zone 14 will be used first to oxidize organic compounds before the nitrate oxygen can be used. Thus, dissolved oxygen will decrease the BOD available in the anoxic zone 14 to effectuate complete denitrification then the total denitrification process is hampered.

Therefore, it is a principal object of the invention to reduce the dissolved oxygen concentration of the mixed liquor being recycled to the anoxic zone 14. To accomplish this, the present process introduces an exhauster holding tank indicated by the numeral 28. Here the mixed liquor being recycled in line 26 is held for a sufficient time period to substantially reduce the dissolved oxygen concentration of the mixed liquor. In a preferred process, the dissolved oxygen concentration should be reduced to approximately 0.5 ppm or below. This can be accomplished with a detention time of approximately 15–30 minutes. Preferably, the exhauster holding tank 28 would be mixed and there would be no oxygen containing gas supplied. The mixing can be carried out by conventional mixing means which would include mechanical mixers as well as the provision of one or more orifices formed at the entrance to holding tank 28. By holding the nitrified mixed liquor in the exhauster holding tank 28 for a selected time, microorganisms continue to utilize dissolved oxygen present to metabolize BOD previously taken up, and nitrify (if ammonia is still present).

Thus, once the nitrified mixed liquor reaches the anoxic zone 14, the dissolved oxygen concentration is preferably 0.5 ppm or below and therefore, has little or no effect on the denitrification process.

From the foregoing discussion, it is appreciated that the present invention presents a very efficient and effective nitrogen removal process.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of exhausting dissolved oxygen in a nitrogen removal wastewater treatment process comprising the steps of:
    (a) forming a mixed liquor;
    (b) denitrifying the mixed liquor by treating the same in an anoxic treatment zone;
    (c) transferring the mixed liquor from the anoxic treatment zone to an oxic treatment zone and nitrifying the mixed liquor; and
    (d) recycling a portion of the nitrified mixed liquor from the oxic treatment zone back to a preceding anoxic zone;
    said recycling step including the steps of transferring the nitrified mixed liquor from the oxic zone to an exhauster holding tank located in a recycle stream, retaining the nitrified mixed liquor in the exhauster holding tank in the absence of supplied oxygen containing gas for a predetermined period to reduce the dissolved oxygen concentration of the mixed liquor, and transferring the deoxygenated, nitrified mixed liquor from the exhauster holding tank to the anoxic zone.

2. The method of claim 1 including the step of mixing the nitrified mixed liquor within the exhauster holding tank.

3. The method of claim 2 including the step of maintaining the nitrified mixed liquor within the exhauster tank for a period of approximately fifteen to thirty minutes.

4. The method of claim 1 including the step of holding the nitrified mixed liquor in the exhauster holding tank a time period sufficient to reduce the dissolved oxygen level of the mixed liquor to less than 0.5 ppm.

* * * * *